(12) United States Patent
Kusafuka et al.

(10) Patent No.: US 12,010,289 B2
(45) Date of Patent: Jun. 11, 2024

(54) COMMUNICATION HEAD-UP DISPLAY SYSTEM, COMMUNICATION DEVICE, MOBILE BODY, AND NON-TRANSITORY COMPUTER-READABLE MEDIUM

(71) Applicant: KYOCERA Corporation, Kyoto (JP)

(72) Inventors: Kaoru Kusafuka, Tokyo (JP); Sunao Hashimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 584 days.

(21) Appl. No.: 17/285,081

(22) PCT Filed: Oct. 28, 2019

(86) PCT No.: PCT/JP2019/042126
§ 371 (c)(1),
(2) Date: Apr. 13, 2021

(87) PCT Pub. No.: WO2020/090713
PCT Pub. Date: May 7, 2020

(65) Prior Publication Data
US 2021/0356751 A1     Nov. 18, 2021

(30) Foreign Application Priority Data
Nov. 2, 2018  (JP) ................................. 2018-207588

(51) Int. Cl.
*H04N 13/366*     (2018.01)
*B60K 35/00*      (2006.01)
(Continued)

(52) U.S. Cl.
CPC .......... *H04N 13/366* (2018.05); *B60K 35/00* (2013.01); *B60K 35/211* (2024.01); *B60K 35/23* (2024.01);
(Continued)

(58) Field of Classification Search
CPC ................ B60K 2370/23; B60K 35/00; B60K 2370/1529; B60K 2370/334;
(Continued)

(56) References Cited

U.S. PATENT DOCUMENTS 6,970,290 B1    11/2005  Mashitani et al.
10,573,074 B1*   2/2020  Bull ........................... G06T 3/20
(Continued)

FOREIGN PATENT DOCUMENTS

EP      3 145 184 A1    3/2017
JP      2001-166259 A   6/2001
(Continued)

*Primary Examiner* — Muhammad N Edun
(74) *Attorney, Agent, or Firm* — Studebaker & Brackett PC

(57) ABSTRACT

A communication head-up display system includes a communication device and a head-up display. The communication device includes a first controller which determines eye-positions of eyes of a user in at least one direction. The head-up display includes a display panel, an optical element, a reflector. The display panel displays a parallax image. The optical element defines a propagation direction of image light emitted from the parallax image. The reflector reflects the image light whose propagation direction is defined by the optical element. The reflector includes a reflection element and a drive device. The reflection element reflects the image light. The drive device changes at least one of position and posture of the reflection element so that the image light reflected by the reflection element arrives at the eye-positions.

8 Claims, 9 Drawing Sheets

(51) Int. Cl.
*B60K 35/21* (2024.01)
*B60K 35/23* (2024.01)
*B60K 35/65* (2024.01)
*G02B 27/00* (2006.01)
*G02B 27/01* (2006.01)
*G02B 30/27* (2020.01)
*H04N 13/305* (2018.01)
*H04N 13/31* (2018.01)

(52) U.S. Cl.
CPC .......... *B60K 35/65* (2024.01); *B60K 2360/23* (2024.01); *G02B 27/0093* (2013.01); *G02B 27/0179* (2013.01); *G02B 2027/0187* (2013.01); *G02B 30/27* (2020.01); *H04N 13/305* (2018.05); *H04N 13/31* (2018.05); *H04N 2213/001* (2013.01)

(58) Field of Classification Search
CPC ........ B60K 2370/73; B60K 2370/1531; G02B 27/0093; G02B 27/0179; G02B 2027/0187; G02B 27/0101; G02B 30/27; G02B 30/30; G02B 2027/0136; H04N 13/31; H04N 13/366; H04N 13/305; H04N 2213/001; H04N 13/322; H04N 13/363

See application file for complete search history.

(56) References Cited

U.S. PATENT DOCUMENTS

| | | | |
|---|---|---|---|
| 2010/0073773 A1* | 3/2010 | Hotta | G02B 27/01 359/630 |
| 2019/0373249 A1 | 12/2019 | Kato et al. | |
| 2020/0049991 A1 | 2/2020 | Kusafuka | |
| 2020/0055395 A1* | 2/2020 | Nakamura | G02B 27/0101 |

FOREIGN PATENT DOCUMENTS

| | | |
|---|---|---|
| JP | 2005-247224 A | 9/2005 |
| JP | 2014-010418 A | 1/2014 |
| JP | 2017-009628 A | 1/2017 |
| WO | 2018/142610 A1 | 8/2018 |
| WO | 2018/199185 A1 | 11/2018 |

* cited by examiner

COMMUNICATION HEAD-UP DISPLAY SYSTEM, COMMUNICATION DEVICE, MOBILE BODY, AND NON-TRANSITORY COMPUTER-READABLE MEDIUM

CROSS-REFERENCE TO RELATED APPLICATIONS

This application claims priority to Japanese Patent Application No. 2018-207588, which was filed on Nov. 2, 2018, the contents of which are incorporated herein by reference in its entirety.

TECHNICAL FIELD

The present disclosure relates to a communication head-up display system, a communication device, a mobile body, and a program.

BACKGROUND

In the related art, a three-dimensional display device including an optical element that causes part of light emitted from a display panel to arrive at the right eye and causes other part of the light emitted from the display panel to arrive at the left eye to carry out 3D display without using glasses has been known (see Patent Literature 1).

CITATION LIST

Patent Literature

Patent Literature 1: Japanese Unexamined Patent Publication JP-A 2001-166259

SUMMARY

A communication head-up display system according to the disclosure includes a communication device and a head-up display. The communication device includes a sensor, a first controller and a first communication unit. The first controller is configured to estimate eye-positions of eyes of a user in at least one direction based on an output of the sensor. The first communication unit is configured to transmit the eye-positions estimated by the first controller. The first communication unit is configured to transmit the eye-positions estimated by the first controller. The head-up display includes a display panel, an optical element, a reflector, and a second communication unit. The display panel is configured to display a parallax image. The optical element is configured to define a propagation direction of image light emitted from the parallax image. The reflector is configured to reflect the image light whose propagation direction is defined by the optical element. The reflector includes a reflection element and a drive device. The reflection element is configured to reflect the image light. The drive device is configured to change at least one of position and posture of the reflection element so that the image light reflected by the reflection element arrives at the eye-positions.

A communication device according to the disclosure is capable of communicating with a head-up display. The head-up display includes a display panel, an optical element, a reflection element, and a drive device. The display panel is configured to display a parallax image. The optical element is configured to define a propagation direction of image light emitted from the parallax image. The reflection element is configured to reflect the image light. The drive device is configured to change at least one of position and a posture of the reflection element. The communication device includes an image capture element, a controller, and a first communication unit. The image capture element is configured to generate a captured image obtained by capturing an image of a user. The controller is configured to estimate eye-positions of eyes in a height direction of the user based on the captured image and generate positional information including the eye-positions in the height direction. The first communication unit is configured to transmit the positional information to the head-up display so that the positional information is used to control the drive device.

A mobile body according to the disclosure includes a communication head-up display system and a mounting unit. The communication head-up display system includes a communication device and a head-up display. The communication device includes a sensor, a first controller and a first communication unit. The first controller is configured to estimate eye-positions of eyes of a user in at least one direction based on an output of the sensor. The first communication unit is configured to transmit the eye-positions estimated by the first controller. The head-up display includes a display panel, an optical element, a reflector, and a second communication unit. The display panel is configured to display a parallax image. The optical element is configured to define a propagation direction of image light emitted from the parallax image. The reflector is configured to reflect the image light whose propagation direction is defined by the optical element. The reflector includes a reflection element and a drive device. The reflection element is configured to reflect the image light. The drive device is configured to change at least one of position and posture of the reflection element so that the image light reflected by the reflection element arrives at the eye-positions. The mounting unit mounts a communication device so that the communication device is movable.

A program according to the disclosure is a program executed by a communication device including an image capture element, a controller, and a communication unit. The communication device is configured to communicate with a head-up display. The head-up display includes a display panel, an optical element, and a reflector. The display panel is configured to display a parallax image. The optical element is configured to define a propagation direction of image light emitted from the parallax image. The reflector includes a reflection element and a drive device. The reflection element is configured to reflect the image light. The drive device is configured to change at least one of position and posture of the reflection element. The controller controls so as to estimate eye-positions of eyes in a height direction of a user based on a captured image generated by capturing an image of the user by the image capture element and generate positional information including the eye-positions in the height direction. The controller controls the communication unit to transmit the positional information to the drive device which changes at least one of the position and posture of the reflection element.

DETAILED DESCRIPTION

It is preferable that image light arrives at eye-positions of eyes of a user appropriately so that the user appropriately views a virtual image of an image projected by a head-up display.

The disclosure provides a communication head-up display system, a communication device, a mobile body, and a program capable of causing a user to view a virtual image appropriately.

Hereinafter, an embodiment of the disclosure will be described with reference to the drawings. The drawings used for the following description are schematic and dimensional ratios or the like on the drawings do not necessarily match the actual dimensional ratios or the like.

Figure 1:
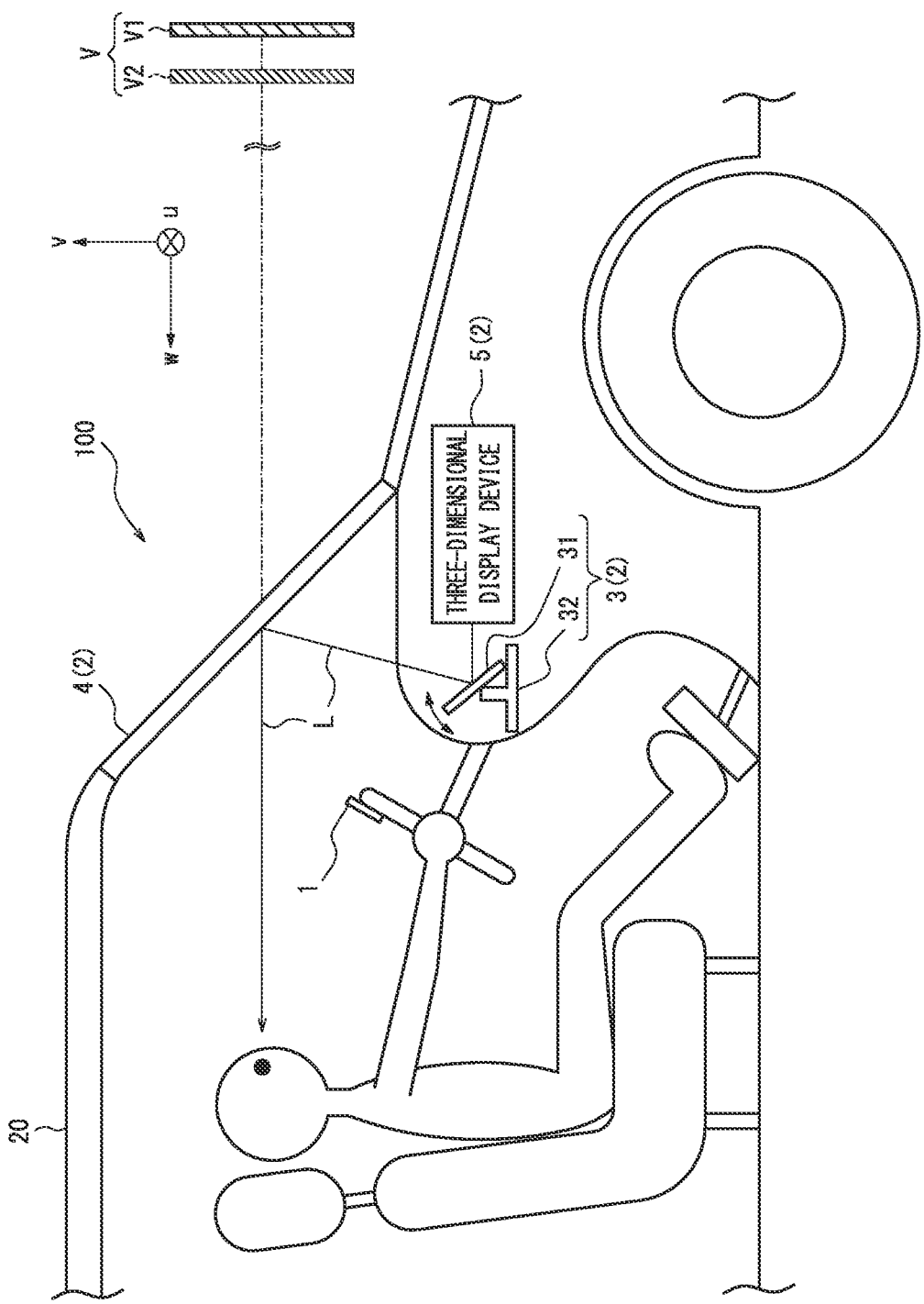
FIG. 1 is a diagram illustrating an example of a communication head-up display system mounted on a mobile body.

As illustrated in FIG. 1, a communication HUD (Head-Up Display) system 100 according to an embodiment of the disclosure includes a communication device 1 and a head-up display (HUD) 2. The communication HUD system 100 may be mounted on a mobile body 20.

In the disclosure, examples of the "mobile body" include vehicles, ships, and airplanes. In the disclosure, examples of "vehicles" include automobiles and industrial vehicles, but the disclosure is not limited thereto. The examples of "vehicles" may include railway vehicles, daily life vehicles, and fixed-wing aircrafts taxiing on the ground. Examples of automobiles include passenger cars, trucks, buses, motorcycles, and trolley buses, but the disclosure is not limited thereto. Examples of automobiles include other vehicles traveling on roads. Examples of the industrial vehicles include industrial vehicles for agriculture and construction. Examples of the industrial vehicles include forklifts and golf carts, but the disclosure is not limited thereto. Examples of the industrial vehicles for agriculture include tractors, tillers, transplanters, binders, combine harvesters, lawn mowers, but the disclosure is not limited thereto. Examples of the industrial vehicles for construction include bulldozers, scrapers, shovel cars, crane trucks, dump cars, and road rollers, but the disclosure is not limited thereto. Examples of vehicles include things traveling with manpower. The classification of the vehicles is not limited to the above-described vehicles. For example, the automobiles may include industrial vehicles which can travel on roads or may include the same vehicles classified into a plurality of classes. Examples of the ships in the disclosure include marine jets, boats, and tankers. Examples of the airplanes include fixed-wing aircrafts and rotary-wing aircrafts.

Figure 2:
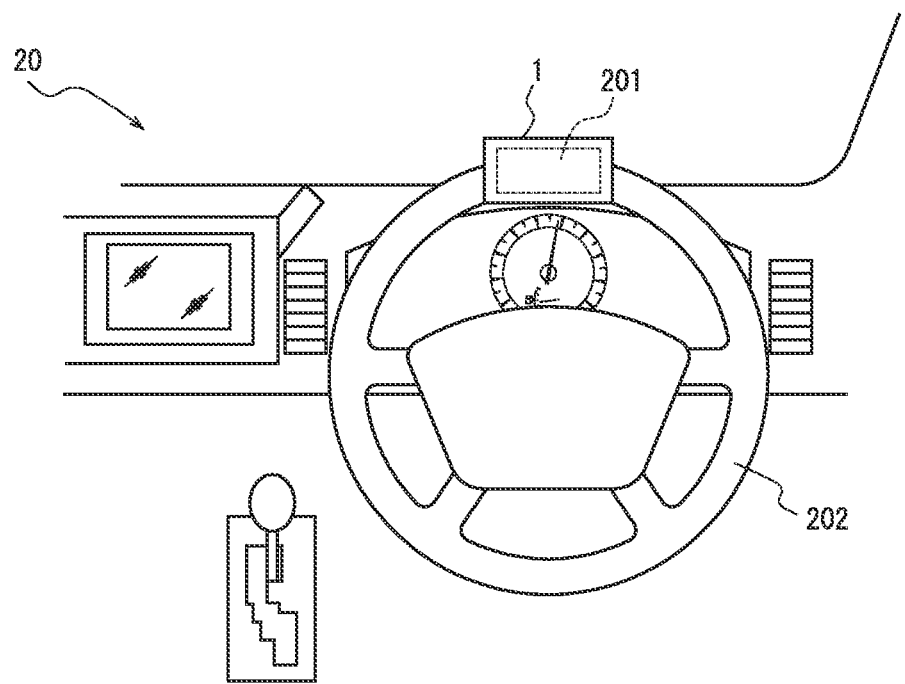
FIG. 2 is a diagram illustrating a state before a communication device illustrated in FIG. 1 moves.
Figure 3:
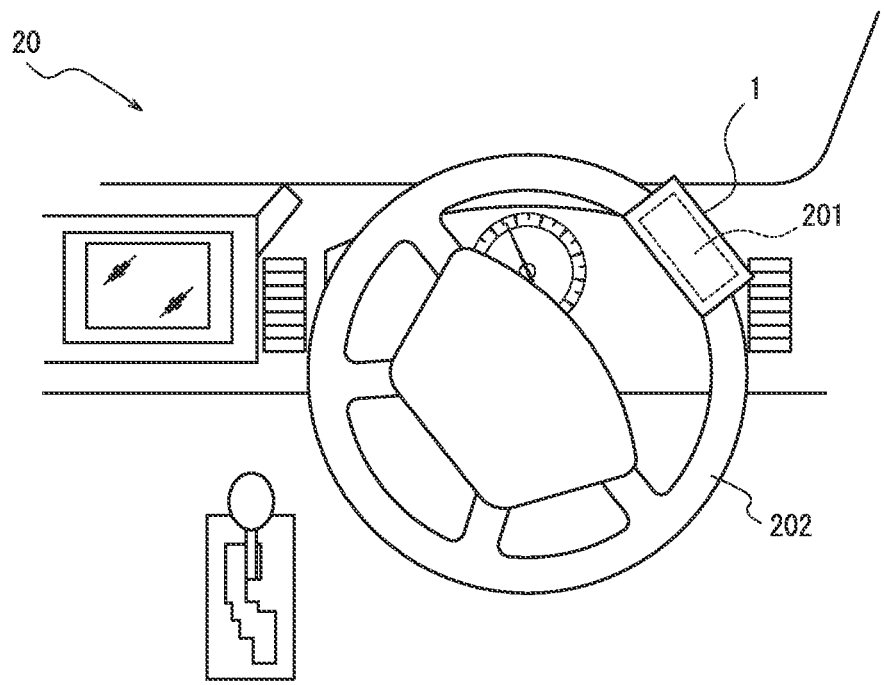
FIG. 3 is a diagram illustrating a state after the communication device illustrated in FIG. 1 moves.

The communication device 1 is disposed so that both eyes of the user can be imaged. The communication device 1 may be mounted in the mobile body 20 to be movable. For example, in a configuration in which the communication HUD system 100 is mounted in the mobile body 20, a mounting unit 201 that mounts the communication device 1 in the vehicle 20 may be fixed to a steering wheel 202, as illustrated in FIG. 2. The communication device 1 is moved to a position different from the position before rotation, as illustrated in FIG. 3, when the steering wheel 202 is rotated in the configuration in which the mounting unit 201 is fixed to the steering wheel 202. That is, the mounting unit 201 can be moved to a plurality of different positions in the real space with the communication device 1 mounted.

Figure 4:
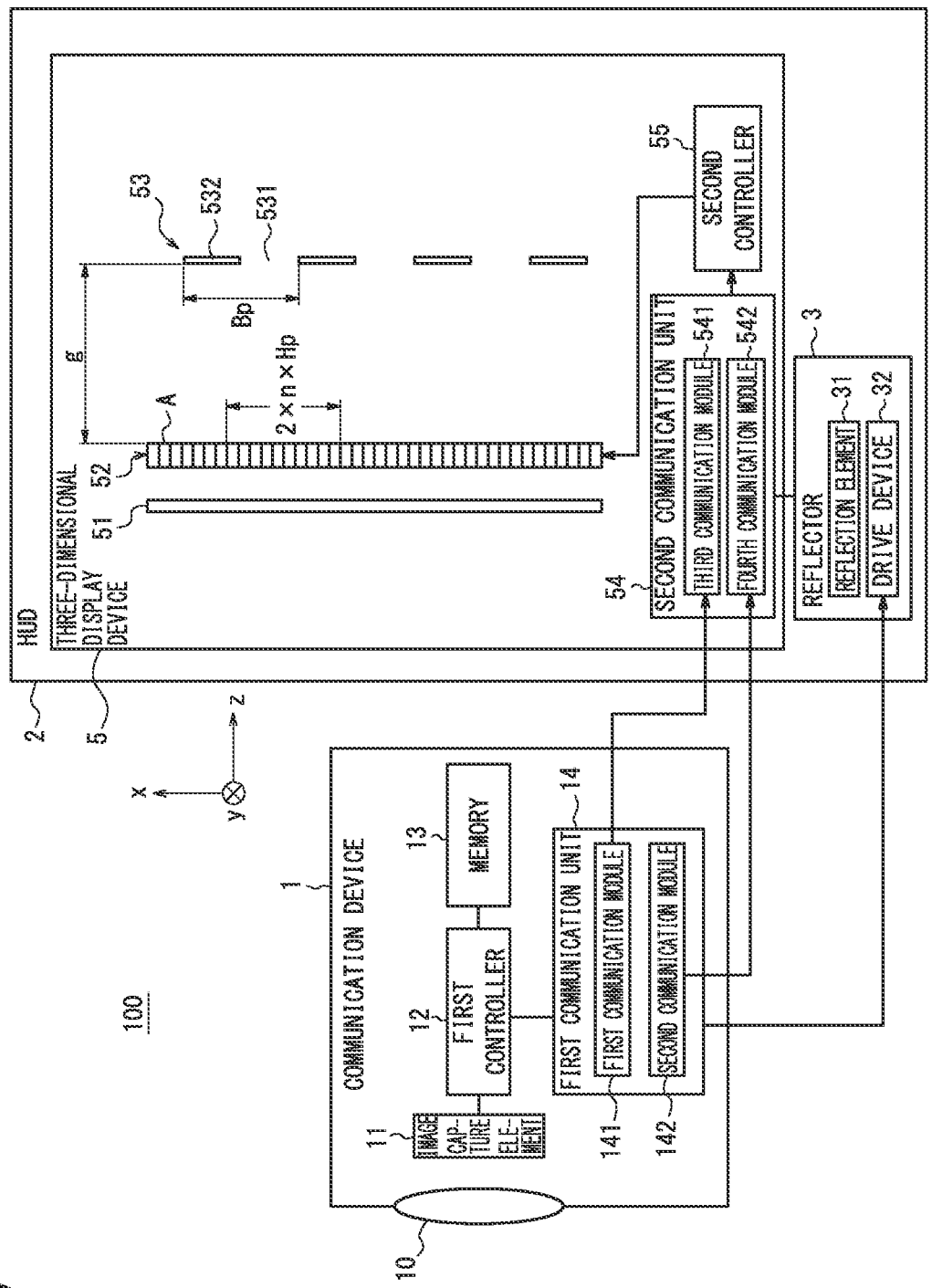
FIG. 4 is a diagram illustrating a schematic configuration of a communication device and a head-up display illustrated in FIG. 1.

As the communication device 1, a general-purpose wireless communication terminal such as a mobile phone, a smartphone, or a tablet terminal can be adopted. As illustrated in FIG. 4, the communication device 1 includes an imaging optical system 10, an image capture element 11, a first controller (controller) 12, a memory 13, and a first communication unit (communication unit) 14.

The imaging optical system 10 includes one or more lenses. The imaging optical system 10 is disposed so that an optical axis of the imaging optical system 10 is perpendicular to an imaging surface of the image capture element 11. The imaging optical system 10 is configured to form light incident from a subject as a subject image on an imaging surface of the image capture element 11.

The image capture element (sensor) 11 may include, for example, a CCD (Charged Coupled Device) image capture element or a CMOS (Complementary Metal Oxide Semiconductor) image capture element. The image capture element 11 is configured to generate a captured image by converting an image formed by the imaging optical system 10 into an electrical signal and output the captured image. For example, the image capture element 11 is configured to image the user along with a predetermined object which is at a predetermined position in the real space and output the captured image and generate a captured image. The image capture element 11 may generate a plurality of captured images in a state in which the communication device 1 is at different positions and output the captured images. For example, as described above, when the steering wheel 202 is automatically or manually rotated in the state which communication device 1 is mounted on the steering wheel 202, as illustrated in FIG. 2, the image capture element 11 can generate a plurality of captured images when the communication device 1 is moved. Before the steering wheel 202 is rotated, the image capture element 11 may generate and output a first captured image. As illustrated in FIG. 3, when the user rotates the steering wheel 202, the image capture element 11 may generate and output a second captured image in the state after rotation.

The first controller 12 is connected to each constituent element of the communication device 1 and is configured to control each constituent element. Constituent elements controlled by the first controller 12 include the image capture element 11, the memory 13, and the first communication unit 14. The first controller 12 may include one or more processors. The first controller 12 may include at least one of a general-purpose processor that reads a specific program and carries out a specific function and a dedicated processor specialized for a specific process. The dedicated processor may include an application specific IC (ASIC: Application Specific Integrated Circuit). The processor may include a programmable logic device (PLD). The PLD may include an FPGA (Field-Programmable Gate Array). The first controller 12 may be one of a SoC (System-on-a-Chip) and a SiP (System In a Package) in which a plurality of processors cooperate.

The details of the first controller 12 will be described in detail later.

The memory 13 is configured by, for example, any storage device such as a RAM (Random Access Memory) and a ROM (Read Only Memory). The memory 13 is configured to store various kinds of information processed by the first controller 12.

For example, the memory 13 is configured to store security information. The security information may include identification information used to uniquely identify the communication device 1 and carry out authentication to enable connection to another device. When the communication device 1 is, for example, a device such as a tablet terminal shared by a plurality of users, the security information may include identification information used to uniquely identify each user.

For example, the memory 13 may store positional information indicating eye-positions of the eyes of the user. The memory 13 may store driving information which indicates at least one of the position and posture of a reflection element 31.

The first communication unit 14 is configured to be able to communicate with the three-dimensional display device 5. A communication scheme used for communication between the first communication unit 14 and the three-dimensional display device 5 may be a short-range wireless communication standard or a wireless communication standard connected to a mobile phone network or may be a wired communication standard. Examples of the short-range wireless communication standard may include WiFi (registered trademark), Bluetooth (registered trademark), infrared light, and NFC (Near Field Communication). Examples of the wireless communication standard for connection to a mobile phone network may include long term evolution (LTE), a fourth generation mobile communication system, or a fifth generation mobile communication system.

The first communication unit 14 may include a first communication unit module 141 and a second communication module 142. The first communication unit module 141 is configured to exchange security information with the HUD 2 in order to establish communication between the communication device 1 and the HUD 2. The first communication unit module 141 may transmit identification information used to identify the communication device 1 or a user of the communication device 1 to the HUD 2. The second communication module 142 may transmit positional information to the HUD 2. For example, the first communication unit module 141 may exchange the security information with the HUD 2 using an NFC communication standard. When connection between the communication device 1 and the HUD 2 is established through authentication based on the security information by the HUD 2, the second communication module 142 may transmit various kinds of information using WiFi. The communication device 1 can transmit and receive various kinds of information according to a general WiFi communication standard after the communication is safely established by exchanging the security information with the HUD 2 according to an NFC communication standard in which wiretapping is difficult. The security information exchanged between the communication device 1 and the HUD 2 may include an encryption key of WiFi communication.

The present invention is not limited thereto, and the first communication module 141 and the second communication module 142 may each carry out communication using any communication standard. The first communication module 141 and the second communication module 142 may carry out communication using the same communication standard.

The HUD 2 includes one or more reflectors 3, an optical member 4, and the three-dimensional display device 5.

The reflector 3 is configured to reflect image light emitted from the three-dimensional display device 5 toward a predetermined region of the optical member 4. The predetermined region is a region in which the image light reflected from the predetermined region heads for the eyes of the user. The predetermined region can be determined according to the direction of the eyes of the user to the optical member 4 and a direction of incidence of the image light to the optical member 4. One or more reflectors 3 include one or more reflection elements 31 and drive devices 32.

Each reflection element 31 may be a mirror. When the reflection element 31 is a mirror, the mirror may be, for example, a concave mirror. In FIG. 1, one or more reflection elements 31 are displayed as one mirror. However, the disclosure is not limited thereto and one or more reflection elements 31 may be configured by one or more mirrors.

The drive device 32 is configured to drive the reflection element 31 based on eye-positions of the eyes of the user and change at least one of the position and posture of the reflection element 31. For example, the drive device 32 has a communication function and is configured to receive positional information from the communication device 1. The drive device 32 may directly receive positional information from the communication device 1. The drive device 32 is configured to compute at least one of the position and posture of the reflection element 31 by which the image light arrives at the eye-positions of the user from eye-positions of the eyes indicated by the positional information. The drive device 32 is configured to drive the reflection element 31 and carry out control such that a value of at least one of the position and posture of the reflection element 31 is computed.

The optical member 4 is configured to reflect the image light emitted from the three-dimensional display device 5 and reflected from one or more reflectors 3 toward the left eye (a first eye) and the right eye (a second eye) of the user. For example, a windshield of the mobile body 20 may also serve as the optical member 4. Accordingly, the HUD 2 is configured so that the light emitted from the three-dimensional display device 5 travels to the left eye and the right eye of the user along an optical path L. The user can view light arriving along the optical path L as a virtual image V.

As illustrated in FIG. 4, the three-dimensional display device 5 includes an irradiator 51, a display panel 52, a parallax barrier 53 serving as an optical element, a second communication module 54, and a controller 55. In the configuration in which the HUD 2 is mounted on the mobile body 20, the three-dimensional display device 5 may be stored in a dashboard of the mobile body 20.

The irradiator 51 can planarly irradiate the display panel 52. The irradiator 51 may include a light source, a light-guiding plate, a diffusion plate, and a diffusion sheet. The irradiator 51 is configured to emit irradiation light from the light source and homogenize the irradiation light in a planar direction of the display panel 52 by the light-guiding plate, the diffusion plate, the diffusion sheet, or the like. The irradiator 51 is configured to emit the homogenized light to the side of the display panel 52.

As the display panel 52, for example, a display panel such as a transmissive liquid crystal display panel can be adopted. The display panel 52 is not limited to a transmissive liquid crystal display panel and another display panel such as an organic EL can be used. When a self-luminous display panel is used as the display panel 52, the three-dimensional display device 5 may not include the irradiator 51. In the following example of the embodiment, the display panel 52 will be described as a liquid crystal panel.

Figure 5:
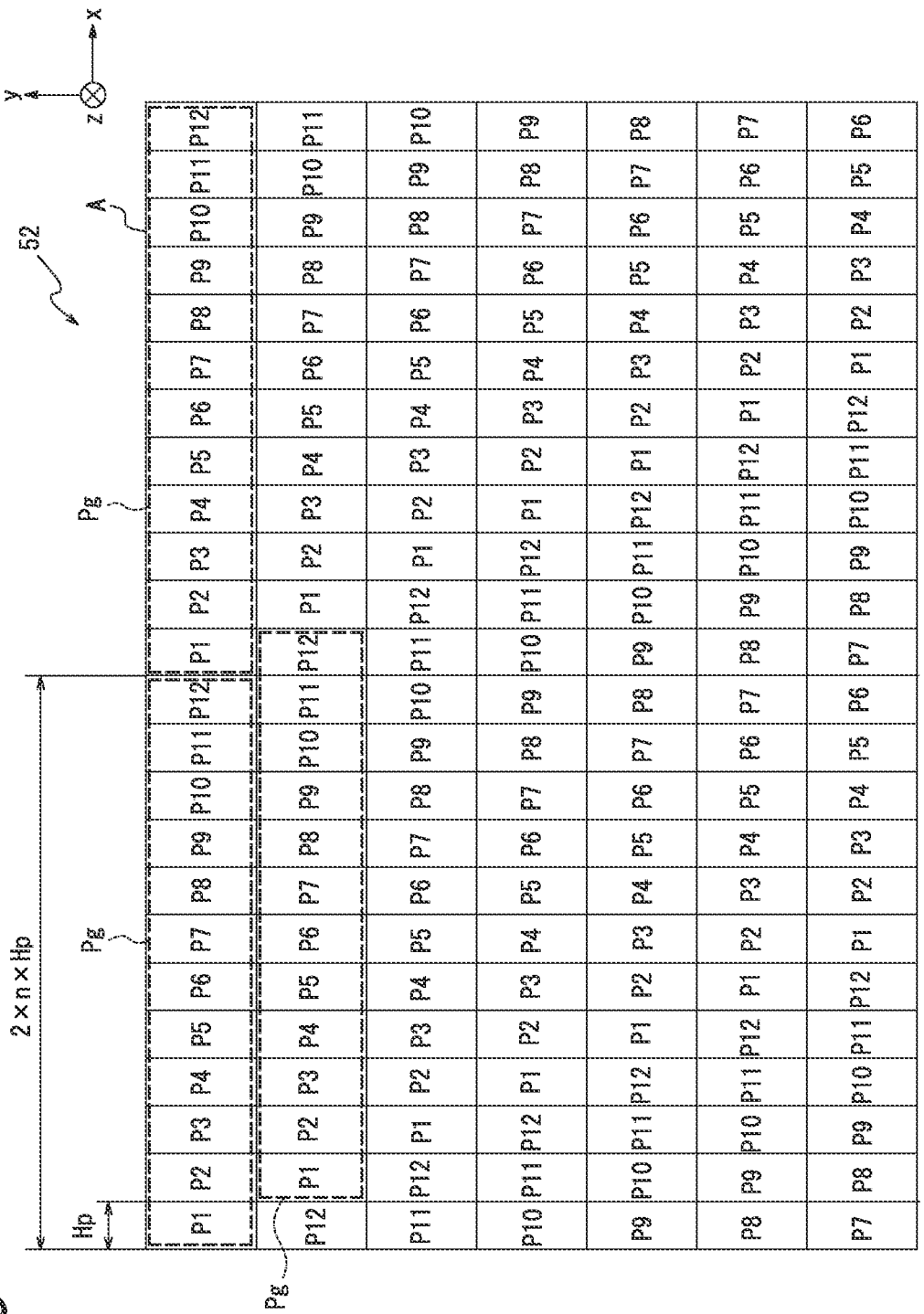
FIG. 5 is a diagram illustrating an example in which a display panel illustrated in FIG. 4 is viewed in a depth direction.

As illustrated in FIG. 5, the display panel 52 includes a plurality of divided regions on an active area A formed in a planar shape. The active area A can display a parallax image. The parallax image includes a left-eye image (a first image) and a right-eye image (a second image) that has a parallax with respect to the left-eye image, as will be described below. The plurality of divided regions are regions divided in a first direction and a second direction perpendicular to the first direction. A direction perpendicular to the first and second directions is referred to as a third direction. The first direction may also be referred to as a horizontal direction. The second direction may also be referred to as a vertical direction. The third direction may also be referred to as a depth direction. However, the first, second, and third directions are not limited thereto. In FIGS. 4 to 6, 9, and 10, the first direction is represented as an x axis direction, the second direction is represented as a y axis direction, and the third direction is represented as a z axis direction. In FIGS. 1 and 7, an inter-eye direction which is a direction in which a straight line passing through the left and right eyes of the user is oriented is represented as a u axis direction, an anteroposterior direction of the user is represented as a w axis direction, and a height direction perpendicular to the u axis direction and the w axis direction is represented as a v axis direction.

Each of the divided regions corresponds to one subpixel. The active area A includes a plurality of subpixels arranged in a lattice form in the horizontal and vertical directions.

Each subpixel corresponds to one of red (R), green (G), and blue (B) and a set of three R, G, and B subpixels can constitute one pixel. One pixel can be referred to as one pixel element. The display panel 52 is not limited to the transmissive liquid crystal panel and another display panel such as an organic EL can be used. When a self-luminous display panel is used as the display panel 52, the three-dimensional display device 5 may not include the irradiator 51.

As described above, the plurality of subpixels arranged in the active area A constitute a subpixel group Pg. The subpixel groups Pg are repeatedly arranged in the horizontal direction. The subpixel groups Pg can be arranged at the same position in the vertical direction and can be arranged to be shifted. For example, the subpixel groups Pg can be repeatedly arranged in the vertical direction to be adjacent to positions shifted by one subpixel in the horizontal direction. The subpixel group Pg includes subpixels in predetermined rows and columns. For example, the subpixel group Pg includes (2×n×b) subpixels P1 to P(2×n×b) in which b subpixels (b rows) in the vertical direction and 2×n (2×n columns) subpixels in the horizontal direction are continuously arranged. In the example illustrated in FIG. 5, n=6 and b=1. In the active area A, the subpixel group Pg including twelve subpixels P1 to P12 in which one subpixel in the vertical direction and twelve subpixels in the horizontal direction are continuously arranged is disposed. In the example illustrated in FIG. 5, reference numerals are given to some subpixel group Pg.

The subpixel group Pg is a minimum unit in which the controller 55 described below carries out control to display a parallax image. The subpixels included in the subpixel group Pg are identified with identification information P1 to P(2×n×b). The subpixels P1 to P(2×n×b) that have the same identification information of the whole subpixel group Pg can be controlled substantially simultaneously by the controller 55. For example, when a parallax image displayed at the subpixel P1 is switched from a left-eye image to a right-eye image, the controller 55 simultaneously switches the parallax image displayed at the subpixel P1 in the whole subpixel group Pg from the left-eye image to the right-eye image.

As illustrated in FIG. 4, the parallax barrier 53 is formed in a planar shape along the active area A, and is disposed away by a predetermined distance from the active area A. The parallax barrier 53 may be positioned on an opposite side of the irradiator 51 with respect to the display panel 52. The parallax barrier 53 may be positioned on the irradiator 51-side with respect to the display panel 52.

Figure 6:
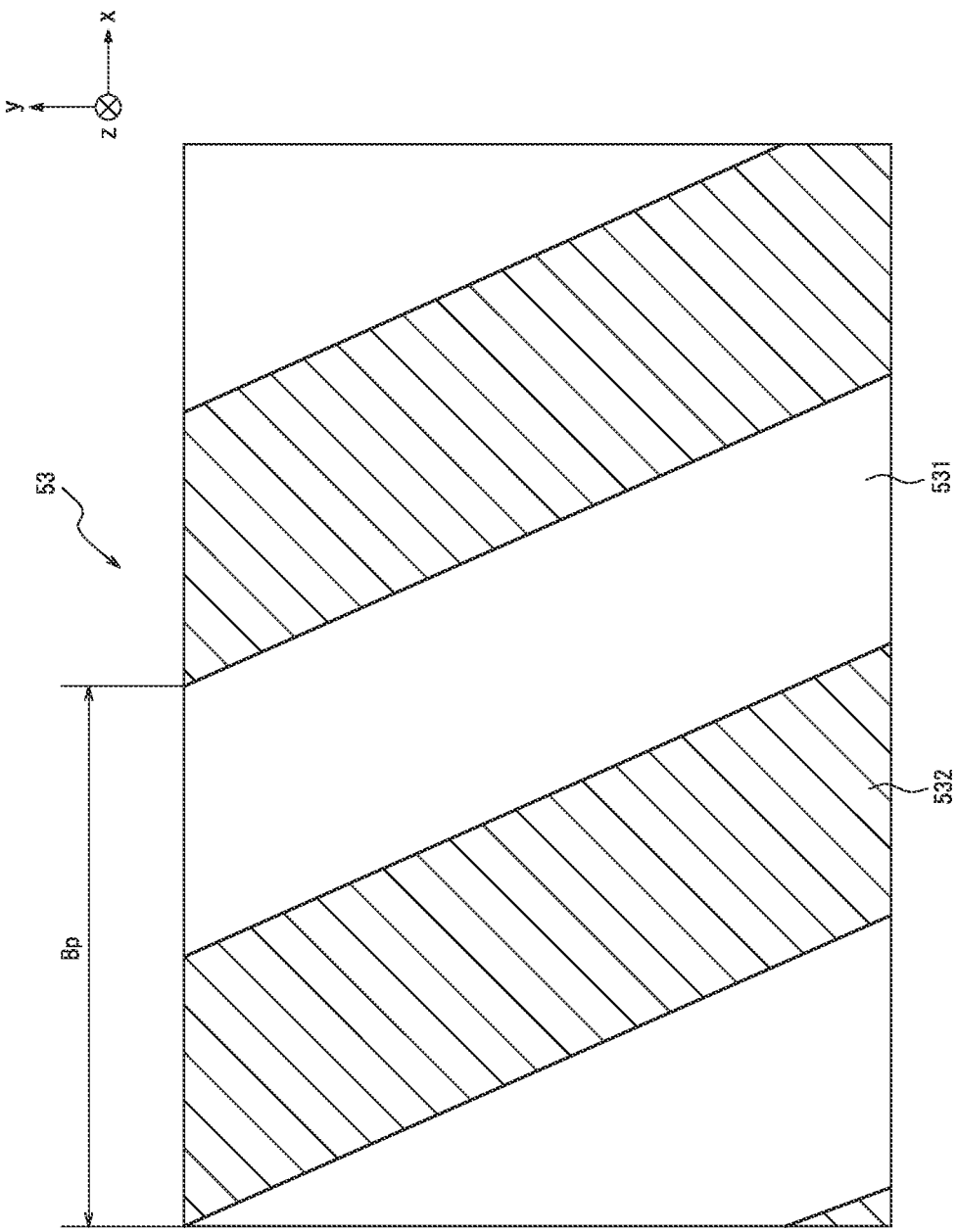
FIG. 6 is a diagram illustrating an example in which a parallax barrier illustrated in FIG. 4 is viewed in the depth direction.
Figure 7:
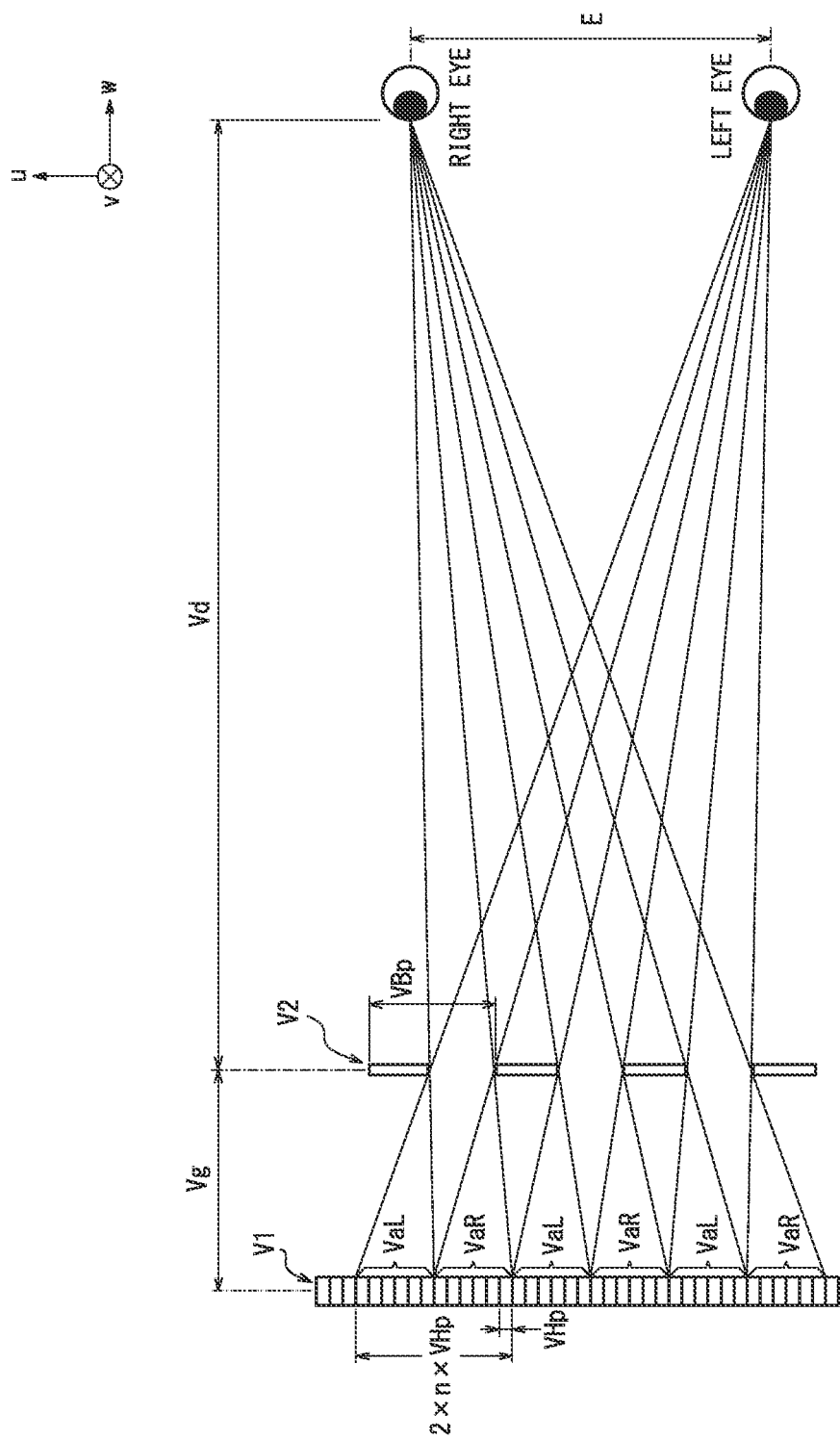
FIG. 7 is a diagram illustrating a relation between a virtual image and eyes of a user, as illustrated in FIG. 1.

As illustrated in FIG. 6, the parallax barrier 53 is configured to define a propagation direction of the image light emitted from the subpixels for each of light-transmitting regions 531 which are a plurality of strip regions extending in a predetermined direction in the plane. For example, the parallax barrier 53 includes a plurality of dimming regions 532 in which the image light is dimmed. The plurality of dimming regions 532 partition the light-transmitting regions 531 between the adjacent dimming regions 532. The light-transmitting region 531 has higher light transmittance than the dimming region 532. The dimming region 532 has lower light transmittance than the light-transmitting region 531. The plurality of light-transmitting regions 531 and the plurality of dimming regions 532 extend in a predetermined direction along the active area A and are alternately arranged repeatedly in a direction perpendicular to the predetermined direction. The predetermined direction is, for example, a direction along a diagonal line of the subpixels, for example. The predetermined direction can be set to a direction which crosses b subpixels in the second direction while crossing a subpixel in the first direction (where a and b are positive relatively prime integers). The predetermined direction may be the second direction.

When the parallax barrier 53 defines a propagation direction of the image light emitted from the plurality of subpixels arranged in the active area A, a region of a first virtual image V1 corresponding to an area of the active area A which can be viewed by the eyes of the user is determined, as illustrated in FIG. 7. Hereinafter, a region in the first virtual image V1 which can be viewed by the user with the image light propagated to the eye-positions of the user is referred to as a visible region Va. A region in the first virtual image V1 which can be viewed by the user with the image light propagated to the eye-position of the first eye of the user is referred to as a first visible region. A region in the first virtual image V1 which can be viewed by the user with the image light propagated to the eye-position of the second eye of the user is referred to as a second visible region. In the disclosure, the first eye corresponds to the left eye and the second eye corresponds to the right eye in the description, but the correspondence can be changed. In the example in which the first eye corresponds to the left eye, the first visible region is referred to as a left visible region VaL. When the second eye is the right eye, the second visible region is referred to as a right visible region VaR.

A virtual image barrier pitch VBp and a virtual image gap Vg which are disposition intervals in the horizontal direction of the light-transmitting region 531 can be defined so that the following expressions (1) and (2) in which an optimal viewing distance Vd used are established. The virtual image barrier pitch VBp is a disposition interval of a virtual image V2 of the light-reducing region 532 in a direction corresponding to the first direction. The virtual image gap Vg is a distance between the second virtual image V2 and the first virtual image V1. In the expressions (1) and (2), a virtual image barrier opening width VBw is a width corresponding to the width of the light-transmitting region 531 in the second virtual image V2. The optimal viewing distance Vd is a distance between the virtual image V2 of the parallax barrier 53 and the eye-position of each of the right and left eyes of the user indicated by the positional information received from the communication device 1. An inter-eye distance E is a distance between the right and left eyes. The inter-eye distance E may be in the range of, for example, 61.1 mm to 64.4 mm which are values computed by a study of National Institute of Advanced Industrial Science and Technology. VHp is a length of a virtual image of the subpixels. VHp is a length of the subpixel virtual image in the first virtual image V1 in a direction corresponding to the first direction.

$$E:Vd=(n \times VHp):Vg \qquad (1)$$

$$Vd:VBp=(Vdv+Vg):(2 \times n \times VHp) \qquad (2)$$

Part of the image light emitted from the active area A of the display panel 52 transmits through the light-transmitting region 531 and arrives at the optical member 4 via one or move reflectors 3. The image light arriving at the optical member 4 is reflected by the optical member 4 and arrives at the eyes of the user. The eyes of the user recognize the first virtual image V1 which is a virtual image of the parallax image displayed in the active area A on the front side of the optical member 4. The front side in the present specification is a direction of the optical member 4 when viewed from the user. The front side is a direction in which the mobile body 20 normally moves.

The user apparently recognizes the parallax image as if the user views the first virtual image V1 via the second virtual image V2 and does not recognize the second virtual image V2 which is a virtual image of the parallax barrier 53 in reality.

The second communication unit 54 is configured to be able communicate with the imaging device 1. The second communication unit 54 includes a third communication module 541 and a fourth communication module 542. The third communication module 541 can communicate with the first communication module 141 according to the same communication standard as the first communication module 141 of the communication device 1. The fourth communication module 542 can communicate with the second communication module 142 according to the same communication standard as the second communication module 142 of the communication device 1.

For example, the third communication module 541 is configured to exchange security information with the first communication module 141. After authentication based on the security information, the third communication module 541 establishes connection with the first communication module 141 and then the fourth communication module 542 establishes connection the second communication module 142. When the fourth communication module 542 establishes the connection with the second communication module 142, the fourth communication module 542 receives various kinds of information from the second communication module 142. The various kinds of information may include, for example, positional information.

The second controller 55 is connected to each constituent element of the HUD 2 and is configured to be able to control each constituent element. The constituent elements controlled by the second controller 55 include the irradiator 51, the display panel 52, and the second communication unit 54. The second controller 55 may include one or more processors. The second controller 55 may include a general-purpose processor that reads a specific program and carries out a specific function and a dedicated processor specified for a specific process. The dedicated processor may include an ASIC. The processor may include a PLD. The PLD may include an FPGA. The second controller 55 may be one of SoC and SiP in which one or a plurality of processors cooperate.

The communication HUD system 100 is configured to carry out initial setting so that the user can view a virtual image of a 3D image before an operation of display the parallax image is started. According to the eye-positions of the user, positions at which the communication HUD system 100 causes the image light to arrive are different. The communication HUD system 100 is configured to carry out estimating the eye-positions, controlling driving of the reflection element 31, and determining the visible region Va so that the user can view the 3D image appropriately according to the eye-positions of the user.

<Estimation of Positions of Eyes>

The first controller 12 may estimate the eye-positions of the right and left eyes from a captured image including an image of both eyes of the user generated by the image capture element 11.

As an example of a method of estimating the eye-positions, the first controller 12 may estimate the eye-positions in the real space based on a positional relation between an image of the eyes and an image of a predetermined object contained in a single captured image generated by the image capture element 11. In a configuration in which the communication device 1 is mounted in the mobile body 20, the predetermined object is an object fixed and attached to the mobile body 20 and is, for example, a headrest of a driver seat, a frame of a side window, or the like.

For example, in association with each position on the captured image, the first controller 12 may store a distance and a direction of the predetermined position from the position of the image of the predetermined object in the real space corresponding to the position in association in the memory 13. In such a configuration, the first controller 12 extracts the eyes from the captured image. The first controller 12 is configured to extract the distance and the direction from the position of the realize space corresponding to the position of the image of the predetermined object, which are stored in the memory 13 in association with the eye-positions on the captured image, from the memory 13. The first controller 12 can estimate the positions in the real space based on the distance and the direction to the positions of the image of the predetermined object.

The first controller 12 is configured to estimate the eye-positions in the real space based on the positions of an image of the predetermined object and an image of at least a part of the body of the user in the single captured image generated by the image capture element 11 and the position of the predetermined object in the real space. The part of the body may be, for example, a top part of the head, the shoulder, an ear, or the like.

As another example of the method of estimating the eye-positions, the first controller 12 may estimate the eye-positions based on a plurality of captured images each generated by the image capture element 11 in a state in which the communication device 1 is at different positions. In the configuration in which the first controller 12 estimates the eye-positions based on the plurality of captured images, as described above, the position of the communication device 1 mounted on the steering wheel 202 can be changed with rotation of the steering wheel 202. For example, the first controller 12 is configured to store information indicating the first position before the rotation of the steering wheel 202, in the memory 13. The image capture element 11 is configured to generate a first captured image when the user is imaged in a state in which the communication device 1 is at the first position. When the steering wheel 202 is rotated and the communication device 1 is stopped at a second position at the rear of the first position, the first controller 12 is configured to store information indicating the second position in the memory 13. The image capture element 11 is configured to image the user in a state in which the communication device 1 is at the second position and generate the second captured image. The first controller 12 is configured to estimate the eye-positions in a three-dimensional space according to an optical flow method or the like based on the eye-positions in each of the first and second captured images and the first and second positions in the real space.

The first controller 12 is configured to generate positional information indicating the estimated eye-positions. The first controller 12 is configured to control the first communication unit 14 such that the first communication unit 14 transmits the positional information to the HUD 2.

<Controlling Driving of Reflector>

When the second communication unit 54 of the HUD 2 receives the positional information transmitted from the first communication unit 14, the drive device 32 of the HUD 2 is configured to drive the reflection element 31 based on the eye-positions in the height direction (the w axis direction) indicated by the positional information. The image light emitted from the three-dimensional display device 5 is reflected toward a predetermined region of the optical member 4 by the reflection element 31. The image light arriving at the predetermined region of the optical member 4 is reflected by the optical member 4 toward the eye-positions of the user. The eye-positions of the user are different depending on the physical feature such as a sitting height or the like of the user or a sitting posture of the user. The drive device 32 is configured to determine at least one of the position and posture of the reflection element 31 so that the image light arrives at the eye-positions based on the eye-positions of the user. The drive device 32 is configured to drive the reflection element 31 so that the determined position and posture are taken.

The drive device 32 may determine at least one of the position and posture of the reflection element 31 based on the eye-positions in the inter-eye direction or the anteroposterior direction rather than the eye-positions in the height direction. The first controller 12 may generate driving information based on the eye-positions in two or more of the height direction, the inter-eye direction, and the anteroposterior direction. The drive device 32 may determines at least one of the position and posture of the reflection element 31 based on the driving information.

<Control of Display Panel>

When the second communication unit 54 of the HUD 2 receives the positional information, the second controller 55 is configured to determine the left visible region VaL and the right visible region VaR using the characteristics of the three-dimensional display device 5 and the inter-eye distance E based on the eye-positions of the user. The characteristics of the three-dimensional display device 5 are the above-described virtual image barrier pitch VBp and virtual gap Vg, and an image pitch (2×n×VHp) of the first virtual image V1. When the second controller 55 of the HUD 2 determines the left visible region VaL and the right visible region VaR, the second controller 55 is configured to cause a part of the active area A to display a left-eye image and cause another part of the active area A to display a right-eye image, based on the left visible region VaL and the right visible region VaR. For example, the second controller 55 is configured to cause the subpixels of which most is included in the left visible region VaL more than a predetermined ratio (for example, 50%) to display the left-eye image. The second controller 55 is configured to cause the subpixels of which most is included in the right visible region VaR more than the predetermined ratio to display the right-eye image. The second controller 55 is configured so that the left eye of the user views the virtual image of the left-eye image more than the predetermined ratio and the right eye views the virtual image of the right-eye image more than the predetermined ratio. Since the right-eye image and the left-eye image have a parallax one another and form a parallax image, the user can view the virtual of the 3-dimensional image.

<Storage of Information in Memory>

When the eye-positions are estimated, the first controller 12 may store positional information indicating the eye-positions in the memory 13. When the positional information is stored in the memory 13 during establishment of the connection of the first communication unit 14 with the HUD 2, the first controller 12 is configured to transmit the positional information to the HUD 2. The second controller 55 of the HUD 2 determines the visible regions Va based on the positional information received from the first communication unit 14. The drive device 32 is configured to determine at least one of the position and posture of the reflection element 31 based on the positional information received from the first communication unit 14. When the process of estimating the eye-positions is carried out once, the first controller 12 can omit the process of estimating the eye-positions while the user starts using the HUD system 100 after the second time.

<<Process Flow of First Controller>>

Figure 8:
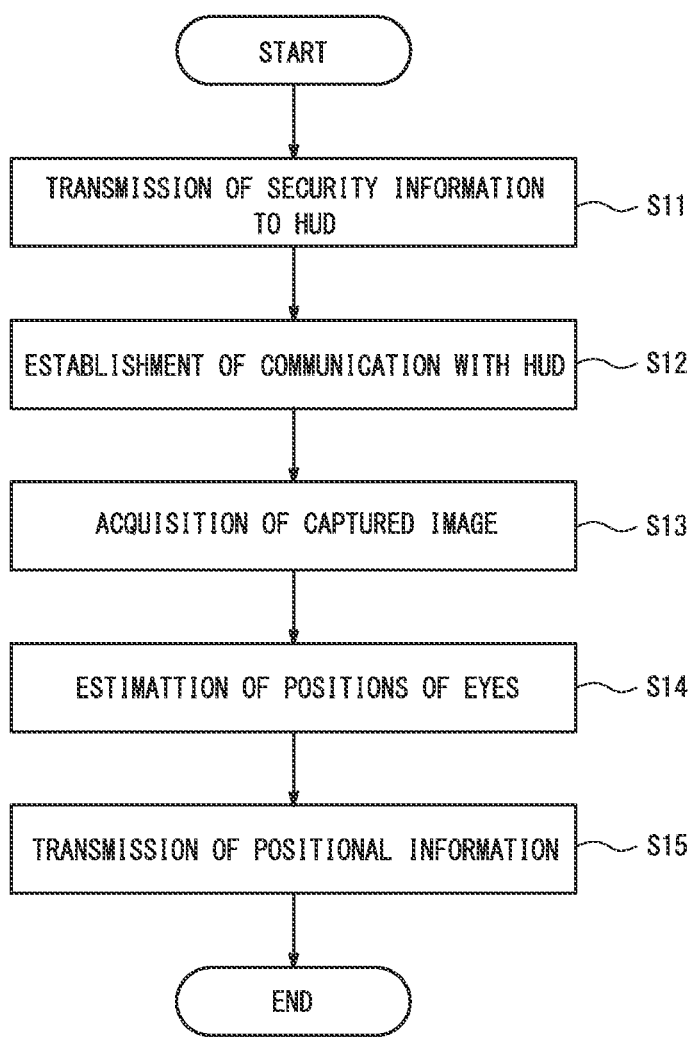
FIG. 8 is a flowchart illustrating an example of a process flow of a first controller illustrated in FIG. 4.

Next, a process carried out by the first controller 12 of the communication device 1 will be described in detail with reference to FIG. 8.

First, the first controller 12 carries out control such that the first communication module 141 transmits the security information to the third communication module 541 of the HUD 2 (step S11).

When the first communication module 141 establishes the connection with the third communication module 541 based on the security information transmitted in step S11, the first controller 12 causes the second communication module 142 to establish connection with the fourth communication module 542 (step S12).

The first controller 12 acquires a captured image captured by the image capture element 11 (step S13).

When the captured image is acquired in step S13, the first controller 12 estimates the eye-positions of the user based on the captured image (step S14).

When the eye-positions are estimated in step S14, the first controller 12 transmits the positional information indicating the eye-positions to the HUD 2 (step S15).

As the communication device 1 according to the above-described embodiment, an information processing device such as a mobile phone, a smartphone, or a table terminal can be adopted. The information processing device can be realized by storing a program that describes processing content for realizing each function of the communication device 1 according to the embodiment in a memory of the information processing device and causing a processor of the information processing device to read and execute the program. The information processing device may be configured to read the program from a non-transitory computer-readable medium and mount thereto. The non-transitory computer-readable medium includes a magnetic storage medium, an optical storage medium, a magneto-optical storage medium, and a semiconductor storage medium, but the disclosure is not limited thereto. The magnetic storage medium includes a magnetic disk, a hard disk, and a magnetic tape. The optical storage medium includes an optical disc such as a CD (Compact Disc), a DVD, a Blu-ray (registered trademark) disc. The semiconductor storage medium includes a ROM (Read Only Memory), an EEPROM (Electrically Erasable Programmable Read-Only Memory), and a flash memory.

As described above, the drive device 32 is configured to change at least one of the position and posture of the reflection element 31 so that the image light reflected by the reflection element 31 arrives at the eye-positions. For example, when the user or the position and posture of the user is changed and the eye-positions are changed, the image light can arrive at the eye-positions. The user can view the parallax image displayed by the three-dimensional display device 5 appropriately.

The first controller 12 is configured to estimate the eye-positions in the height direction and the drive device 32 is configured to change at least one of the position and posture of the reflection element 31 based on the eye-positions in the height direction. For example, when the three-dimensional display device 5 is used in a state in which the user is sitting on a predetermined seat, the eye-positions at which the image light arrives are considerably changed in the height direction more considerably than the other directions in a case in which the user is changed. When the reflection element 31 is changed based on the eye-positions in the height direction, it is possible to considerably prevent a situation in which it is difficult for the user to view a parallax image displayed by the three-dimensional display device 5.

Based on the positions of an image of the eyes and the position of an image of a predetermined object in a captured image, and the predetermined object in the real space, the first controller 12 estimates the eye-positions in the real space. The first controller 12 can estimate the eye-positions using a single captured image without using a plurality of captured images. It is not necessary to set the communication HUD system 100 and generate each captured image before and after a change in the position of the communication device 1, and the communication HUD system 100 can be set more simply.

In the case where the positional information is stored in the memory 13 at a time of establishment of connection of the first communication unit 14 with the HUD 2, the first controller 12 can carry out control such that the first communication unit 14 transmits the positional information to the HUD 2. Therefore, the eye-positions of the user stored in advance can be transmitted to the HUD 2 although the image capture element 11 generates a captured image and the first controller 12 does not estimate the eye-positions whenever the user starts using the HUD system 100. Thus, the communication device 1 can reduce a load.

The above-described embodiment has been described as a representative example, but it should be apparent to those skilled in the art that many changes and substitutions can be made within the scope and gist of the invention. Accordingly, the invention is not limited by the above-described embodiment and various modifications and changes can be made without departing from the scope of the claims. For example, a plurality of configuration blocks described in an embodiment and an example can be combined into one configuration block or one configuration block can be divided.

Figure 9:
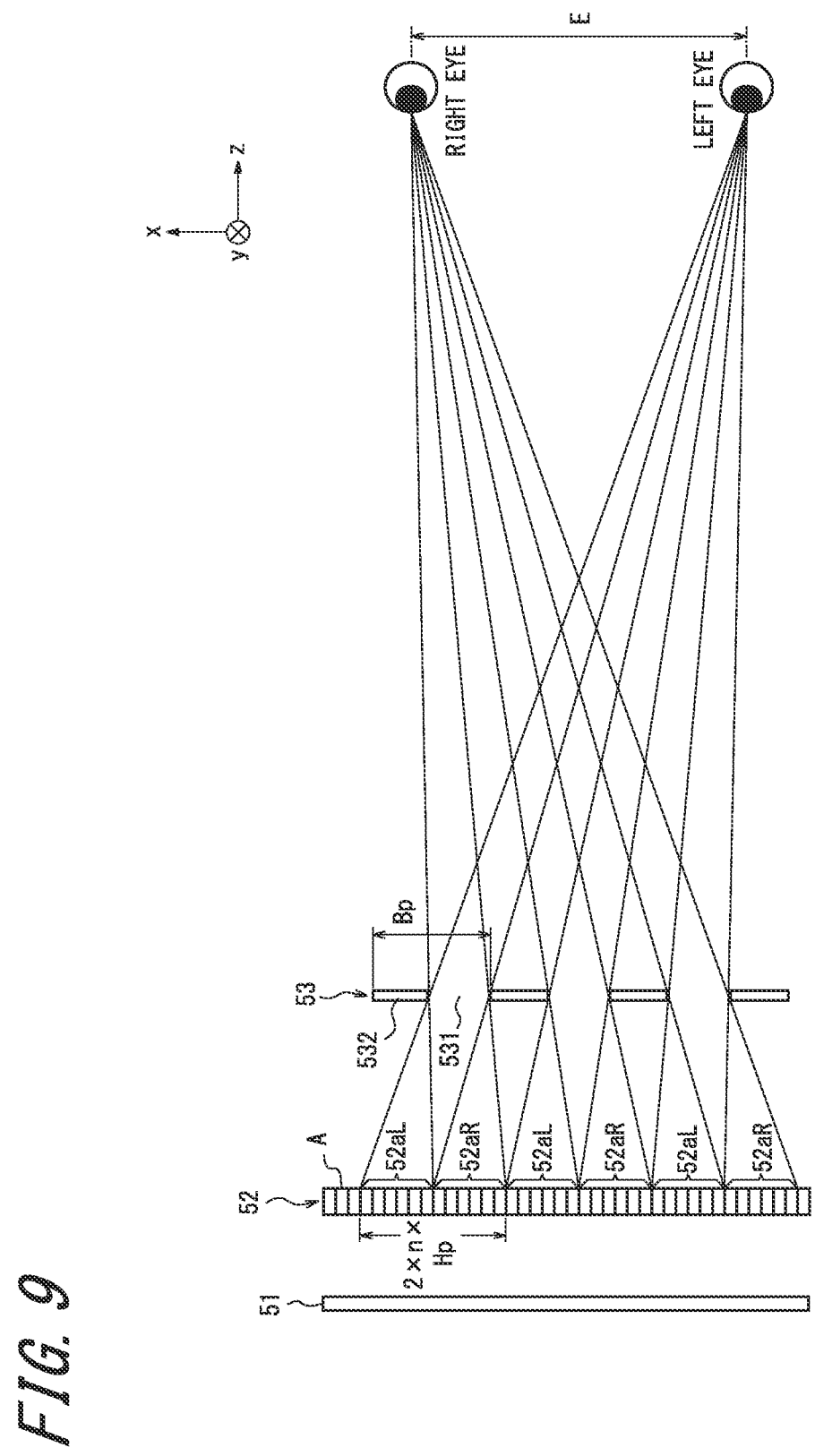
FIG. 9 is a diagram illustrating a positional relation between the eyes of the user and a three-dimensional display device when a user directly views a display panel.

For example, as illustrated in FIG. 9, the three-dimensional display device 5 may be disposed so that the image light emitted from the display panel 52 transmits through the light-transmitting region 531 of the parallax barrier 53 and directly arrives at the eyes of the user without being involved in the reflector 3 and the optical member 4. In such a configuration, as in the above-described configuration, the second controller 55 can be configured to cause a part of the active area A to display the left-eye image and cause the remaining part of the active area A to display the right-eye image, based on visible area information received by the second communication unit 54. For example, the second controller 55 causes the subpixels of which most is included in a left visible region 532aL on the active area A indicated by the visible area information more than a predetermined ratio (for example, 50%) to display a left-eye image. The second controller 55 causes the subpixels of which most is included in a right visible region 532aR indicated by the visible area information more than the predetermined ratio to display a right-eye image. The left eye of the user views a virtual image of the left-eye image more than a virtual image of the right-eye image and the right eye views the virtual image of the right-eye image more than the virtual image of the left-eye image. Since the right-eye image and the left-eye image have a parallax one another and form a parallax image, the user views a 3D image.

For example, in the above-described embodiment, the drive device 32 determines at least one of the position and posture of the reflection element 31, but the invention is not limited thereto. The first controller 12 of the communication device 1 may determine the position and posture of the reflection element 31 based on the eye-positions. In such a configuration, the first controller 12 may generate driving information indicating the position and posture of the reflection element 31 and cause the first communication unit 14 to transmit the driving information. The drive device 32 may drive the reflection element 31 based on the driving information transmitted from the first communication unit 14.

For example, in the above-described embodiment, the second controller 55 of the HUD 2 determines the left visible region VaL and the right visible region VaR, but the invention is not limited thereto. The first controller 12 of the communication device 1 may determine the left visible region VaL and the right visible region VaR using the characteristics of the three-dimensional display device 5 and the inter-eye distance E, based on the eye-positions of the user. In such a configuration, the first controller 12 may generate visible region information indicating the left visible region VaL and the right visible region VaR and cause the first communication unit 14 to transmit the visible region information. The second controller 55 of the HUD 2 may display the parallax image on the display panel 52, based on the driving information transmitted from the first communication unit 14.

Figure 10:
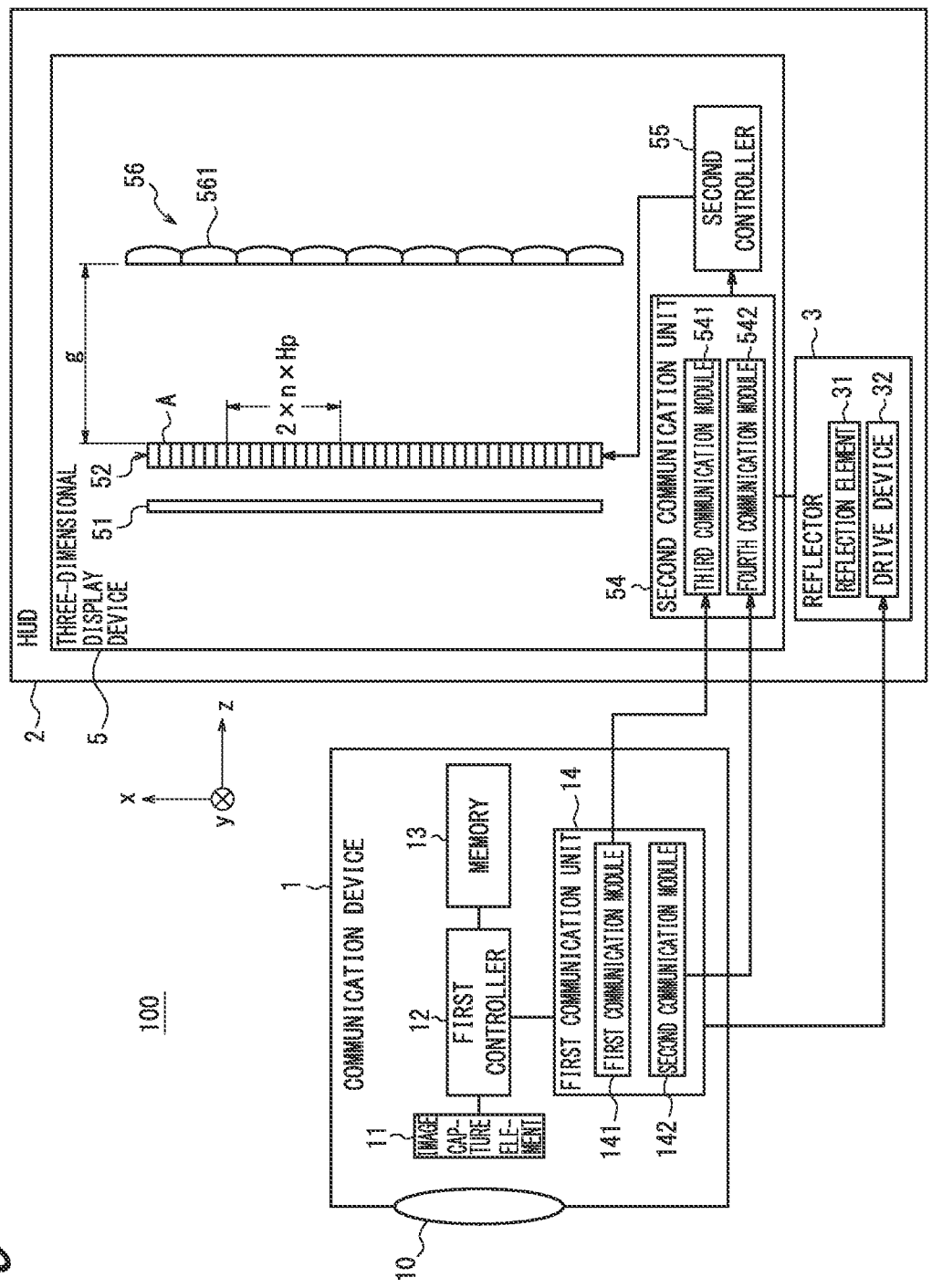
FIG. 10 is a diagram illustrating a schematic configuration of a three-dimensional display device when an optical element is a lenticular lens.

For example, in the above-described embodiment, the optical element is the parallax barrier 53, but the invention is not limited thereto. For example, as illustrated in FIG. 10, the optical element may be a lenticular lens 56. Here, the lenticular lens 624 is configured so that cylindrical lens 561 extending in the perpendicular direction are arranged in the horizontal direction on a plane. The lenticular lens 56 causes image light emitted from some subpixels to propagate to the eye-position of the left eye of the user and causes image light emitted from some other subpixels to propagate to the eye-position of the right eye of the user as in the parallax barrier 53.

REFERENCE SIGNS LIST

1: Communication device
2: Head-up display
3: Reflector
4: Optical member
5: Three-dimensional display device
10: Imaging optical system
11: Image capture element
12: First communication module
13: Memory
14: First communication unit
20: Mobile body
31: Reflection element
32: Drive device
51: Irradiator
52: Display panel
53: Parallax barrier
54: Second communication unit
55: Second controller
56: Lenticular lens
141: First communication module
142: Second communication module
201: Mounting unit
202: Steering wheel
541: Third communication module
542: Fourth communication module
561: Cylindrical lens
531: Light-transmitting region
532: Dimming region
A: Active area
V1: First virtual image
V2: Second virtual image
VaL: Left visible region
VaR: Right visible region
52aL: Left visible region
52aR: Right visible region
100: Communication head-up display system

The invention claimed is:

1. A communication head-up display system, comprising:
a communication device comprising
a sensor, a first controller configured to estimate eye-positions of eyes of a user in at least one direction based on an output of the sensor, and a first communication unit configured to transmit the eye-positions estimated by the first controller; and
a head-up display comprising
a display panel configured to display a parallax image,
an optical element configured to define a propagation direction of image light emitted from the parallax image,
a reflector configured to reflect the image light whose propagation direction is defined by the optical element, and
a second communication unit configured to be able to receive the eye-positions from the communication device,
the reflector comprising
a reflection element configured to reflect the image light, and
a drive device configured to change at least one of position and posture of the reflection element so that the image light reflected by the reflection element arrives at eye-positions acquired by the second communication unit, wherein
the communication device further comprises a memory that stores positional information indicating the eye-positions,
in a case where the positional information is stored in the memory when the first communication unit establishes connection with the head-up display, the first controller controls the first communication unit so as to transmit the positional information to the head-up display,
the first communication unit comprises
a first communication module configured to transmit identification information used to identify the communication device or a user of the communication device, to the head-up display, and
a second communication module configured to transmit the positional information to the head-up display,
the second communication unit comprises
a third communication module configured to receive the identification information from the first communication module, and
a fourth communication module configured to receive the positional information from the second communication module, and
the first controller is configured to establish connection of the fourth communication module with the second communication module after communication between the first and third communication module is established.

2. The communication head-up display system according to claim 1, wherein
the first controller is configured to estimate eye-positions in a height direction of the user, and
the drive device is configured to change at least one of position and posture of the reflection element, based on the eye-positions in the height direction.

3. The communication head-up display system according to claim 1, wherein
the sensor is an image capture element configured to capture an image of the user and a predetermined object which is at a predetermined position in a real space and generate a captured image, and
the first controller is configured to, based on an image of at least a bodily part of the user and a position of an image of the predetermined object in the captured image, and a position of the predetermined object in the real space, estimate eye-positions of the eyes of the user in the real space.

4. The communication head-up display system according to claim 1, wherein
the communication device is installed to be able to move to a plurality of different positions in a real space, and
the sensor is an image capture element configured to capture images of the user at the plurality of different positions and generate a plurality of captured images, and
the first controller is configured to, based on a position of an image of at least a bodily part of the user in each of the plurality of captured images and a plurality of different positions of the image capture element at a time of imaging the user, estimate the eye-positions of the eyes of the user in the real space.

5. The communication head-up display system according to claim 1, wherein the head-up display comprises a second controller configured to, after the drive device changes at least one of position and posture of the reflection element, determine subpixels at which a first image is displayed so that a first eye of the user views the first image in the parallax image, and subpixels at which a second image is displayed so that a second eye of the user views the second image in the parallax image, based on eye-positions of the eyes of the user.

6. A communication device capable of communicating with a head-up display, the head-up display comprising a display panel configured to display a parallax image, an optical element configured to define a propagation direction of image light emitted from the parallax image, and a reflector configured to reflect the image light whose propagation direction is defined by the optical element, the reflector comprising a reflection element configured to reflect the image light and a drive device configured to change at least one of position and posture of the reflection element, the communication device comprising:
   an image capture element configured to generate a captured image obtained by capturing an image of a user;
   a controller configured to estimate eye-positions of eyes in a height direction of the user, based on the captured image and generate positional information comprising eye-positions in the height direction; and
   a communication unit configured to transmit the positional information to the head-up display so that the positional information is used to control the drive device, wherein
   the communication unit comprises a first communication unit configured to transmit the eye-positions estimated by the controller,
   the head-up display comprises a second communication unit configured to be able to receive the eye-positions from the first communication unit,
   the communication device further comprises a memory that stores positional information indicating the eye-positions,
   in a case where the positional information is stored in the memory when the first communication unit establishes connection with the head-up display, the first controller controls the first communication unit so as to transmit the positional information to the head-up display,
   the first communication unit comprises
      a first communication module configured to transmit identification information used to identify the communication device or a user of the communication device, to the head-up display, and
      a second communication module configured to transmit the positional information to the head-up display,
   the second communication unit comprises
      a third communication module configured to receive the identification information from the first communication module, and
      a fourth communication module configured to receive the positional information from the second communication module, and
   the first controller is configured to establish connection of the fourth communication module with the second communication module after communication between the first and third communication module is established.

7. A mobile body, comprising:
   a communication head-up display system comprising
      a communication device comprising a sensor, a first controller configured to estimate eye-positions of eyes of a user in at least one direction based on an output of the sensor, and a first communication unit configured to transmit the eye-positions estimated by the first controller, and
      a head-up display comprising a display panel configured to display a parallax image, an optical element configured to define a propagation direction of image light emitted from the parallax image, a reflector configured to reflect the image light whose propagation direction is defined by the optical element, and a second communication unit configured to be able to receive the eye-positions from the first communication unit, the reflector comprising a reflection element configured to reflect the image light and a drive device configured to change at least one of position and posture of the reflection element so that the image light reflected by the reflection element arrives at eye-positions; and
   a mounting unit configured to mount the communication device so that the communication device is movable, wherein
   the communication device further comprises a memory that stores positional information indicating the eye-positions,
   in a case where the positional information is stored in the memory when the first communication unit establishes connection with the head-up display, the first controller controls the first communication unit so as to transmit the positional information to the head-up display,
   the first communication unit comprises
      a first communication module configured to transmit identification information used to identify the communication device or a user of the communication device, to the head-up display, and
      a second communication module configured to transmit the positional information to the head-up display,
   the second communication unit comprises
      a third communication module configured to receive the identification information from the first communication module, and
      a fourth communication module configured to receive the positional information from the second communication module, and
   the first controller is configured to establish connection of the fourth communication module with the second communication module after communication between the first and third communication module is established.

8. A non-transitory computer-readable medium storing a program executed by a controller of a communication device comprising an image capture element, the controller, and a communication unit, the communication device being configured to communicate with a head-up display, the head-up display comprising a display panel configured to display a parallax image, an optical element configured to define a propagation direction of image light emitted from the parallax image, and a reflector configured to reflect the image light whose propagation direction is defined by the optical element, the reflector comprising a reflection element configured to reflect the image light and a drive device configured to change at least one of position and posture of the reflection element, wherein
   the communication device comprises a first communication unit configured to transmit eye-positions estimated by the controller, the head-up display comprises a second communication unit configured to be able to receive the eye-positions from the first communication unit, the communication device further comprises a memory that stores positional information indicating the eye-positions, in a case where the positional information is stored in the memory when the first communication unit establishes connection with the head-up display, the first controller controls the first communication unit so as to transmit the positional information to the head-up display, the first communication unit comprises
- a first communication module configured to transmit identification information used to identify the communication device or a user of the communication device, to the head-up display, and
- a second communication module configured to transmit the positional information to the head-up display, the second communication unit comprises
- a third communication module configured to receive the identification information from the first communication module, and
- a fourth communication module configured to receive the positional information from the second communication module, and the first controller is configured to establish connection of the fourth communication module with the second communication module after communication between the first and third communication module is established, the program causing the controller to control such that, based on a captured image generated by capturing an image of a user by the image capture element, eye-positions of eyes in a height direction of the user are estimated and positional information comprising the eye-positions in the height direction is generated; and to control the communication unit to transmit the positional information to the head-up display so that the positional information is used to control the drive device.

* * * * *